(12) United States Patent
Boldon et al.

(10) Patent No.: US 7,624,391 B2
(45) Date of Patent: Nov. 24, 2009

(54) DEVICE-BASED MODEL FOR SOFTWARE DRIVER DELIVERY AND UPGRADE

(75) Inventors: John Leland Boldon, Emmett, ID (US); Joseph Edward Halpern, III, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1781 days.

(21) Appl. No.: 10/012,715

(22) Filed: Nov. 5, 2001

(65) Prior Publication Data

US 2003/0088866 A1  May 8, 2003

(51) Int. Cl.
G06F 9/44 (2006.01)
(52) U.S. Cl. .................. 717/169; 717/168; 717/170
(58) Field of Classification Search ......... 717/168–178; 710/62, 300
See application file for complete search history.

(56) References Cited

U.S. PATENT DOCUMENTS

| | | | |
|---|---|---|---|
| 5,155,847 A | | 10/1992 | Kirouac et al. |
| 5,960,189 A | | 9/1999 | Stupek, Jr. et al. |
| 6,607,314 B1 | * | 8/2003 | McCannon et al. ........... 400/62 |
| 6,622,246 B1 | * | 9/2003 | Biondi ........................ 713/100 |
| 6,668,376 B1 | * | 12/2003 | Wang et al. .................. 717/178 |
| 6,704,824 B1 | * | 3/2004 | Goodman .................... 710/300 |
| 6,889,510 B2 | * | 5/2005 | Song et al. .................... 62/132 |
| 2002/0067504 A1 | * | 6/2002 | Salgado et al. ............. 358/1.15 |
| 2002/0073415 A1 | * | 6/2002 | Kim et al. .................... 717/173 |
| 2002/0087759 A1 | * | 7/2002 | Toyoshima ................... 710/62 |
| 2002/0087960 A1 | * | 7/2002 | Hisatake ...................... 717/168 |
| 2003/0066066 A1 | * | 4/2003 | Nguyen et al. .............. 717/178 |

FOREIGN PATENT DOCUMENTS

| | | | | |
|---|---|---|---|---|
| JP | 11003220 A | * | 1/1999 |
| JP | 11161443 A | * | 6/1999 |
| JP | 2000040003 A | * | 2/2000 |

\* cited by examiner

*Primary Examiner*—Lewis A Bullock, Jr.
*Assistant Examiner*—Jue S Wang

(57) ABSTRACT

A method and apparatus for facilitating the upgrade of device drivers for computer peripheral devices includes detecting a version of the device driver in use by the computer from data sent by the computer to the peripheral device determining whether the version of the device driver may be out of date signaling the computer if it is determined that a newer version of the device driver may be available.

25 Claims, 3 Drawing Sheets

DEVICE-BASED MODEL FOR SOFTWARE DRIVER DELIVERY AND UPGRADE

TECHNICAL FIELD OF THE INVENTION

The present invention relates in general to detection of device driver versions by computer peripherals and to installation and upgrade of device drivers in response to signals or instructions from peripheral devices. In particular, the present invention relates to detection of device driver versions by imaging devices, such as printers, faxes, copiers, plotters, digital projectors, terminals, and so forth, and to installation and upgrade of imaging device drivers in response to signals or instructions from imaging devices.

BACKGROUND OF THE INVENTION

Referring to FIG. 1, before a computer document or file 110 is sent by a computer to be printed or otherwise imaged on a medium 150, such as paper, the computer must first convert a screen representation 120 (or a word processing or image file) to information in a format that can be understood by an imaging device 140 that actually does the printing. Such operations are performed by software on the computer commonly referred to as device drivers. The format of the information supplied to the imaging device by the device driver may differ depending on the kind of imaging device in use. For example, an imaging device directly connected to a port of a personal computer receives information sent by the computer essentially in a bitmap format, i.e., a format that provides a pixel-by-pixel representation of the document or image, although, typically, some data compression will be performed. More complex imaging devices intended for use in network environments such as depicted generally in FIG. 2, have onboard processors that receive and translate imaging information that has been sent in a more concise format. For printer imaging devices, this format is referred to as a printer device language (PDL). PDLs such as Hewlett Packard Printer Command Language (PCL) and Adobe Postscript® provide instructions to imaging devices that describe the document to be imaged in terms of characteristics such as fonts, typographical characters, document layout, geometric shapes, and other attributes that can be interpreted by the imaging device by referring to a library maintained by the imaging device. A PDL imaging job thus can be transmitted efficiently over a network or other transmission link and processed by an imaging device that has the necessary PDL processing capability. In any event, regardless of whether the imaging job is transmitted in bitmap, PCL, or other format, the imaging job is generated on the computer by software referred to as a device driver.

A number of device drivers are likely to be available for the same basic imaging device. Device drivers exist for different operating systems, PDLs, computer hardware capabilities, imaging device hardware features, software versions, firmware releases, compression schemes, and so forth. In addition, new versions (releases) of imaging device drivers are released by manufacturers from time to time to address known bugs and to add additional features. It would be best to install new imaging device drivers as soon as possible after their release to ensure proper operation and take advantage of all of the capabilities of the imaging devices. Unfortunately, installation of the new drivers does not always take place until after a problem with the imaging device has been noted and a service call has been made. Of course, service calls can be quite expensive and users can become frustrated with their machines resulting in lost productivity. Occasionally tech support staff may even inadvertently contribute to the problem in the course of installing new software since it is sometimes the case that a new version of a program or operating system is packaged with one or more out of date device drivers. Use of out of date device drivers can result in less than optimal imaging device performance, cause errors in imaging and possibly provoke network and computer crashes. It is thus desirable to ensure, with a minimum of user or staff intervention, that device drivers be the latest versions available. The present invention addresses the foregoing problems, at least in part, as well as other problems, which will be understood by reading and studying the following specification.

BRIEF SUMMARY OF THE INVENTION

A device-based model for software driver delivery and upgrade is disclosed. In one embodiment, a method for facilitating the upgrade of a device driver for a computer peripheral device comprises detecting a version of the device driver in use by the computer from data sent by the computer to the peripheral device, determining whether the version of the device driver may be out of date, and signaling the computer if it is determined that the device driver may be out of date.

DETAILED DESCRIPTION OF THE INVENTION

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Embodiments of the present invention determine whether peripheral device drivers in use on computers may not be the most current version available. In addition, embodiments of the present invention provide information about where a computer can locate the latest version of a peripheral device driver. In some embodiments, the peripheral device uploads the latest version device driver to the computer. While the invention has been described below in terms of an imaging device, it will be appreciated by those of ordinary skill in the art that the invention applies equally to any peripheral device in which a device driver is used to communicate data to and from the computer.

Figure 1:
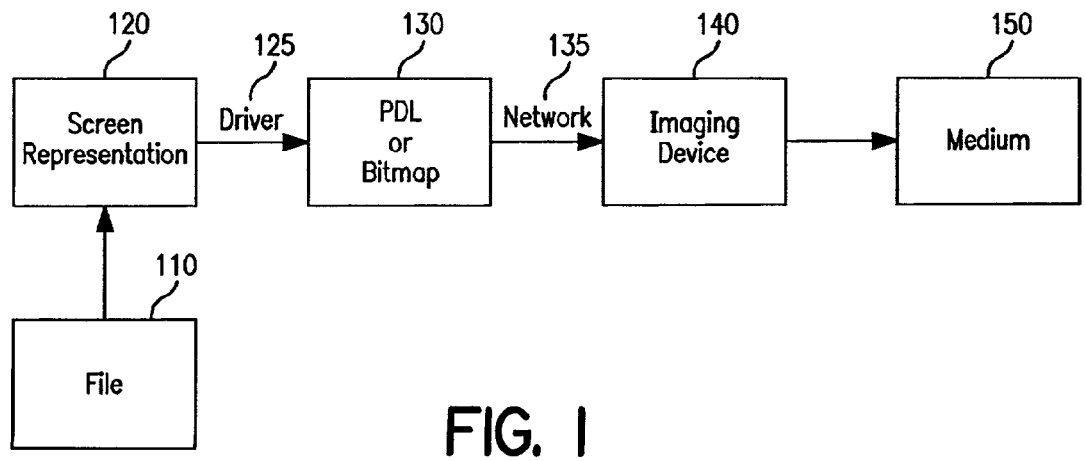
FIG. 1 is a simplified flow diagram of operation of a computer connected to an imaging device.
Figure 2:
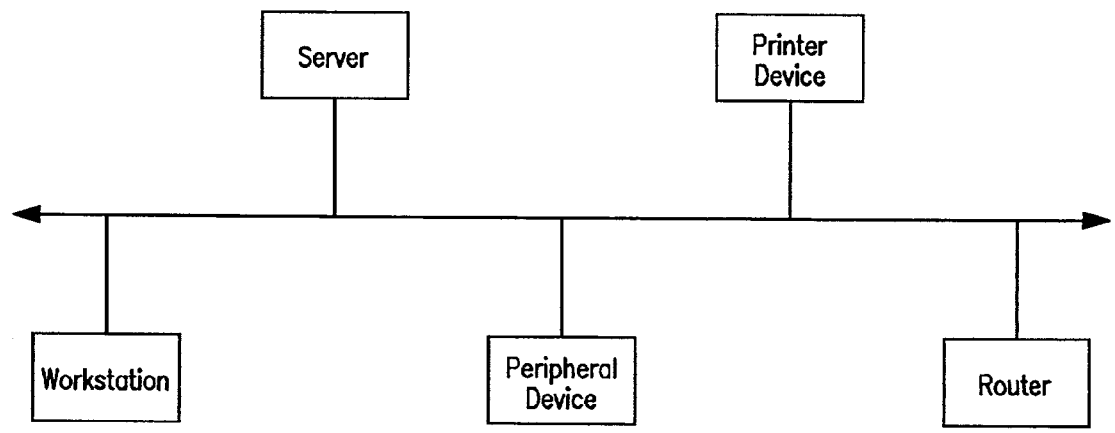
FIG. 2 is a simplified diagram of a network with computers peripheral devices servers and routers in accordance with an embodiment of the present invention.
Figure 3:
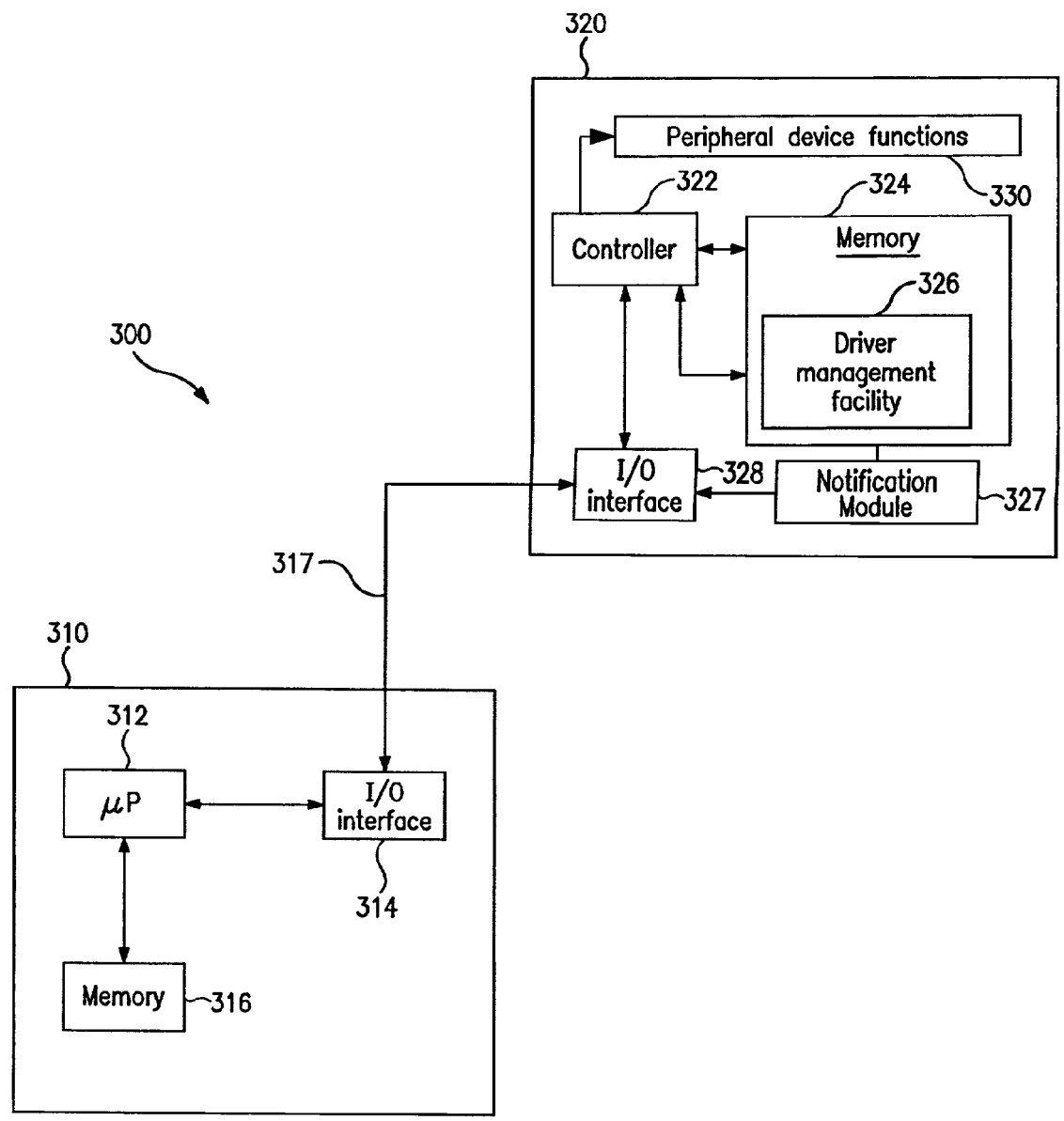
FIG. 3 is a diagram of an imaging device connected to a computer.

FIG. 3 shows a simplified diagram of a typical system 300 including a computer 310 and an imaging device 320 linked to computer 310 via a data link 317 in accordance with an embodiment of the present invention. Imaging device 320 includes a controller 322. Controller 322 executes instructions and provides control signals to imaging device functions block 330, which handles the operations of imaging device 320. Controller 322 may be a simple device controller such as a controller for an ink jet printer, or may be a sophisticated processor such as used by an imaging device capable of use in a network environment. Memory 324 may be any memory device suitable for use in a computer or computer peripheral device, such as a flash memory, a random access memory, a magnetic or optical storage medium, and so forth, or any combination of the foregoing. Memory 324 provides storage capability for program instructions and data used by controller 322 including driver management facility 326. Driver management facility 326 includes instructions and data for identification of drivers in use by computer 310 and also may include instructions for handling responses to various driver configurations detected on computer 310. Computer 310 includes processor 312, which executes instructions and processes data contained in a memory or storage location 316. I/O interface 314 provides capability for handling communications between imaging device 320 and computer 310 via I/O interface 328 on imaging device 320.

Figure 4:
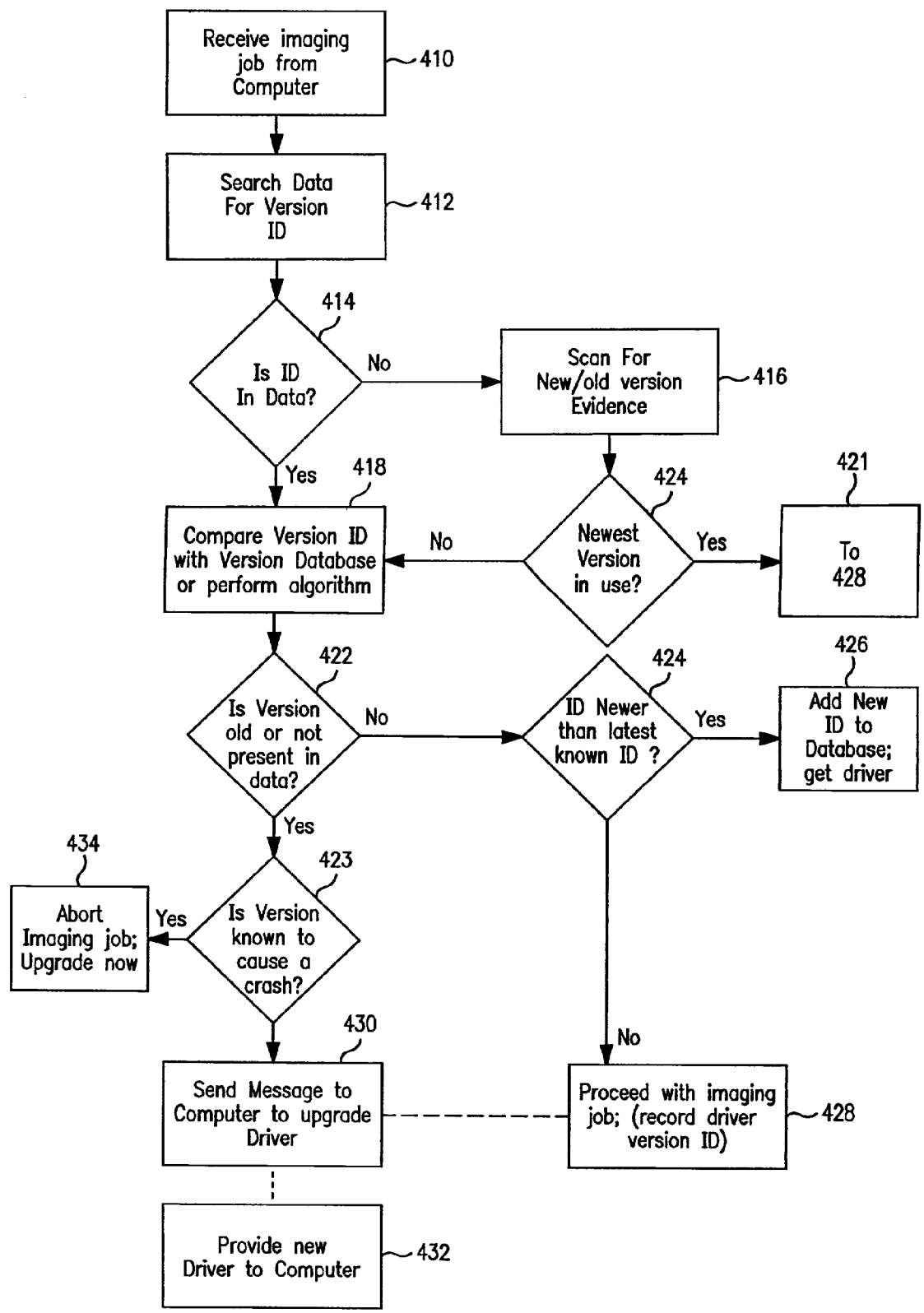
FIG. 4 is a flow diagram of the operation of an embodiment of the present invention.

Referring to FIG. 4, basic operation of an example of the invention will now be described. Initially, when imaging device 320 receives an imaging job from computer 310 at 410, the driver management facility 326 attempts to determine at 412 whether the latest driver has been used by computer 310 in preparing the imaging job by searching the imaging job data for a version identifier. In one example, driver management facility 326 will search or scan the imaging job data to attempt to locate a device driver version identifier (for example, a version number or other designation). Many PDL files typically provide a "comment" (i.e., a string of text) in the file header setting forth the version identifier of the driver. Thus, a search of the imaging job data may be limited to searching a file header or other section where a version identifier is likely to be found. If a driver version identifier is found by the search, imaging device 320 will at 418 compare the version identifier to the version identifiers known to the imaging device to be the latest versions or perform an algorithm to determine if the driver version is a latest version. For example, imaging device 320 may consult a table, list or database stored in a memory onboard the imaging device 320 to determine the latest version identifiers. Alternatively, an algorithm could be used that analyzes the version identifier with reference to a key, code or sequence (such as a date) to see if the version is up to date. Driver version information, of course, may be kept up to date on imaging device 320 by accessing a master database via a network or Internet link or address or by downloading an update from time to time such as when imaging device 320 is being serviced. Alternatively, if version identifiers follow a predetermined code or sequence so that the age of the version may be determined algorithmically, a database may be unnecessary.

If no driver version identifier is found at 412 by searching the imaging job data, then imaging device 320 may branch at 414 to process the PDL file for other information indicating whether the imaging job was prepared by a latest version driver. For example, if a version identifier is not found in the header or other predetermined section where a version identifier is expected, imaging device 320 may scan the imaging job data at 416 to determine if it meets certain criteria for data generated by the latest version of device driver. Thus, for example, if a latest driver version provides new data in the job file on a feature such as multiple collated copies, imaging device 320 may scan for evidence of such features and thereby reach a conclusion at 420 about which driver version is in use. Other settings and codes could likewise be used in 416 to determine which version driver was in use by computer 310. For example, data artifacts known not to be present in imaging job files prepared by a latest version driver could be used to determine whether the driver version was out of date. If a newest version of driver is detected at 416 the print job will be allowed to proceed at 421.

If the device driver identifier is found in the job data and is determined at 418 not to be an old version identifier at 422 and the version identifier is determined at 424 not to be newer than the newest version known to imaging device 320, it will process the imaging job at 428 without interruption, perhaps recording, for diagnostic purposes, that computer 310 is apparently using the latest version driver.

Imaging device 320 can respond in a variety of ways to detection of a driver that is determined to be out of date or not detectable from the job data. If, at 422, the version identifier is determined not to belong to a latest known version, or if no version identifier can be detected, imaging device 320 may signal computer 310 at 430 that it is using a driver that is not the latest version, or that a version identifier could not be detected. Computer 310 may, in turn, display a message to the user advising that the user may wish to check to see if the imaging device driver should be updated, or query the user whether the job should be terminated. In some implementations, imaging device 320 may offer to provide the latest driver to computer 310 at 432 if the user wishes it to do so. As noted, a latest driver version could be stored on the imaging device 320 or at some other storage location that could be accessed by computer 310. Alternatively, at 423, if the version identifier corresponds to a device driver that will cause a computer, imaging device or system wide crash, imaging device may abort the imaging job at 434.

Computer 310 may be programmed to respond to messages or signals from imaging device 320 concerning out of date or unknown driver version information in various ways. For example, computer 310 may simply inform the user that the driver is out of date or unknown and proceed with the imaging job without interruption. Computer 310 may inform the user that the driver is out of date or unknown and query the user whether to proceed to download the new driver before processing the imaging job or wait until later to update the driver. Under some circumstances, it may be best to automatically terminate the print job upon determining that the driver is out of date. If operation of the imaging device 320 may be seriously disrupted by the out of date driver, imaging device 320 may decide at 423 to spontaneously abort the imaging job and provide a message to the user that the imaging device driver must be upgraded before any imaging jobs can be completed. Where compatibility issues are not likely to disrupt operation of imaging device 320, imaging device 320 may inform the user of the nature of the compatibility issues if the imaging job were allowed to proceed using the current driver and allow the user to decide whether the imaging job should proceed. Information involving out of date drivers may, of course, be maintained by imaging device 320 in a database or table in memory 324 and sent to computer 310 for display to the user.

In the event that a driver version is detected that is newer than the latest version known to imaging device 320 at 424, imaging device 320 may update its database of version numbers at 426 to reflect the newest device driver version in use by computer 310. Imaging device 320 may also attempt to obtain a copy of the latest device driver from computer 310 for later distribution to other computers in the network.

In some instances it may be desirable to upgrade the driver automatically if imaging device 320 detects that the driver version may not be the latest one available. Computer 310 can display such a message to the user and ask for instructions on how to proceed. If compatibility issues are not likely to prevent completion of an imaging job, computer 310 may simply provide a message such as a pop-up text box informing the user that the imaging device driver is likely to be out of date ands should be upgraded soon. Computer 310 may also advise the user to contact the imaging device manufacturer or technical support staff to obtain the latest version. In some implementations it may be desirable to allow imaging device 320 to upgrade the device driver automatically without user intervention.

Alternatively, if Internet access is available, a dialogue box may query the user as to whether the user wishes to obtain the latest version of the driver from the Internet site of the manufacturer. In such a case, computer 310 (or imaging device 320) may log in to the manufacturer's Internet site and obtain the latest driver. Security arrangements such as the exchange of digital certificates could also be employed to insure that new drivers are obtained via a secure connection. To avoid disrupting the user, computer 310 may be programmed to automatically respond to an out of date driver signal from imaging device 320 by logging into the manufacturer's web site and downloading the latest driver or scheduling the download at a more convenient time.

In another example, the latest driver version may be stored in a storage location in imaging device 320 such as an onboard memory. New driver versions stored on removable memory modules or the like may be installed in imaging device 320 in the course of performing routine service on the device. Such a removable plug-in memory device may conveniently be integrated with a marking material cartridge or module provided by the manufacturer. Alternatively, imaging device 320 may download the latest driver over the Internet, or obtain copies of the driver from a dialup connection.

CONCLUSION

A device driver management facility for determining whether a device driver in use by a computer is the latest version, and in some embodiments, for providing an updated copy of the device driver to the computer, has been detailed.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for facilitating the upgrade of a device driver installed on a computer that is intended for use with a computer peripheral device, the method comprising:
    detecting a version of the device driver in use by the computer from imaging job data sent by the computer to the peripheral device by scanning the imaging job data to determine if it meets certain criteria for data generated by a latest version of the device driver;
    determining whether the version of the device driver may be out of date; and
    signaling the computer if it is determined that the device driver may be out of date.

2. The method of claim 1 further comprising storing a copy of at least one updated device driver in a predetermined location that may be accessed by the computer.

3. The method of claim 2 further comprising providing data to the computer to enable the computer to locate an updated device driver.

4. The method of claim 1 further comprising automatically upgrading the device driver without user intervention.

5. The method of claim 4 wherein the peripheral device automatically upgrades the device driver by automatically providing an updated device driver to the computer.

6. The method of claim 4 wherein the computer automatically upgrades the device driver by downloading an updated device driver from a remote network location.

7. The method of claim 1 further comprising the peripheral device retrieving a copy of an updated device driver from a remote storage location.

8. The method of claim 1, wherein scanning the imaging job data to determine if it meets certain criteria for data generated by a latest version of the device driver comprises scanning the imaging job data for a feature that the latest version of the device driver performs.

9. The method of claim 8, wherein the feature comprises a functionality that the latest version of the device driver performs.

10. The method of claim 1, wherein scanning the imaging job data to determine if it meets certain criteria for data generated by a latest version of the device driver comprises scanning the imaging job data for artifacts known to be present in imaging job data prepared by the latest version of the device driver.

11. An imaging device comprising:
    a driver management facility that is configured to detect a version of a device driver from imaging job data sent by a computer to the imaging device by scanning the imaging job data to determine if it meets certain criteria for data generated by a latest version of the device driver; and
    a notification module that is configured to transmit information back to the computer about the version of the device driver.

12. The imaging device of claim 11 wherein the information is used to display a message to an end user of the computer.

13. The imaging device of claim 11 wherein an update copy of a device driver is stored in a memory of the imaging device.

14. The imaging device of claim 13 wherein the memory of the imaging device is removable.

15. The imaging device of claim 11 wherein the imaging job data comprises printer control language.

16. The imaging device of claim 11 wherein the imaging device provides information to the computer to enable the computer to obtain a newer version of the device driver.

17. The imaging device of claim 16 wherein the information comprises an address.

18. The imaging device of claim 11 wherein the imaging device maintains a list of version identifiers of device drivers.

19. The imaging device of claim 11 wherein the imaging device stores a copy of an updated device driver.

20. The imaging device of claim 11 wherein the imaging device retrieves a copy of an updated device driver from a remote storage location upon detecting that the device driver in use may be out of date.

21. The imaging device of claim 11 wherein the driver management facility is further configured to automatically upgrade the device driver without user intervention by automatically providing an updated device driver to the computer.

22. A computer-readable media tangibly embodying a program of instructions executable by a computer and/or a computer peripheral device to perform a method for facilitating the upgrade of device drivers for computer peripheral devices, the method comprising:

detecting a version of the device driver in use by the computer from imaging job data sent by the computer to the peripheral device by scanning the imaging job data to determine if it meets certain criteria for data generated by a latest version of the device driver;

determining, by the peripheral device, whether the version of the device driver may be out of date; and signaling the computer if it is determined that a newer version of the device driver may be available.

23. The media as in claim 22 wherein the method further comprises:

storing a copy of at least one updated device driver in a predetermined location; and providing information to the computer by the peripheral device enabling the computer to locate and download a copy of the at least one updated device driver if the peripheral device has determined that the updated device driver is a newer version than the version in use by the computer.

24. The media as in claim 22 wherein the method further comprises automatically upgrading the device driver without user intervention.

25. The media as in claim 22 wherein the method further comprises retrieving a copy of an updated device driver from a remote storage location.

* * * * *

UNITED STATES PATENT AND TRADEMARK OFFICE
CERTIFICATE OF CORRECTION

PATENT NO. : 7,624,391 B2  
APPLICATION NO. : 10/012715  
DATED : November 24, 2009  
INVENTOR(S) : John Leland Boldon et al.

Page 1 of 1

It is certified that error appears in the above-identified patent and that said Letters Patent is hereby corrected as shown below:

In column 6, line 45, in Claim 13, delete "update" and insert -- updated --, therefor.

Signed and Sealed this

Thirty-first Day of August, 2010

David J. Kappos
*Director of the United States Patent and Trademark Office*